(12) United States Patent
Friend et al.

(10) Patent No.: US 9,131,119 B2
(45) Date of Patent: Sep. 8, 2015

(54) PERCEPTION BASED LOADING

(71) Applicant: Caterpillar Inc., Peoria, IL (US)

(72) Inventors: Paul R. Friend, Morton, IL (US); Qi Chen, Dunlap, IL (US); Eric A. Reiners, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 413 days.

(21) Appl. No.: 13/686,779

(22) Filed: Nov. 27, 2012

(65) Prior Publication Data

US 2014/0146167 A1 May 29, 2014

(51) Int. Cl.
  *G01S 13/88* (2006.01)
  *H04N 7/18* (2006.01)
  *G01S 17/02* (2006.01)
  *G01S 17/06* (2006.01)
  *G01S 17/74* (2006.01)
  *G01S 5/16* (2006.01)

(52) U.S. Cl.
  CPC .. *H04N 7/18* (2013.01); *G01S 5/16* (2013.01); *G01S 17/023* (2013.01); *G01S 17/06* (2013.01); *G01S 17/74* (2013.01)

(58) Field of Classification Search
  USPC .......................................... 701/523; 348/135
  See application file for complete search history.

(56) References Cited

U.S. PATENT DOCUMENTS

| 4,281,342 | A | 7/1981 | Ueda et al. | |
|---|---|---|---|---|
| 5,901,236 | A | 5/1999 | Mizui | |
| 6,362,875 | B1 | 3/2002 | Burkley | |
| 6,389,334 | B1 | 5/2002 | Castor | |
| 7,010,404 | B2 * | 3/2006 | Ichijo et al. | 701/50 |
| 2010/0076710 | A1 * | 3/2010 | Hukkeri et al. | 702/97 |
| 2010/0198491 | A1 * | 8/2010 | Mays | 701/124 |
| 2011/0304477 | A1 | 12/2011 | Yoshihashi et al. | |
| 2012/0078440 | A1 * | 3/2012 | Oravis et al. | 701/1 |
| 2014/0146167 | A1 * | 5/2014 | Friend et al. | 348/118 |
| 2014/0300732 | A1 * | 10/2014 | Friend et al. | 348/135 |

FOREIGN PATENT DOCUMENTS

WO    2010064989 A1    6/2010

* cited by examiner

*Primary Examiner* — Thomas G Black
*Assistant Examiner* — Tyler Paige
(74) *Attorney, Agent, or Firm* — Leydig, Voit & Mayer, Ltd.

(57) ABSTRACT

Systems and methods for assisted positioning of a haul machine at a destination position for receiving materials from a loading machine are provided. The method includes obtaining from at least one perception device information reflecting a location or orientation of a first fiducial attached to the loading machine; determining a location or position of the first fiducial based on the information provided by the at least one perception device; determining the destination position based on the location or position of the first fiducial; and issuing guidance to an operator of the haul machine indicating an adjustment in steering angle based on the determined destination position.

20 Claims, 8 Drawing Sheets

PERCEPTION BASED LOADING

TECHNICAL FIELD

The present disclosure generally relates to alignment of mining vehicles with other mining equipment. More specifically, the present disclosure relates to alignment of a large haul machine with a loading tool used in mining operations.

BACKGROUND

A common activity that occurs during construction and mining is moving of material. This is most efficiently done by using a loading machine to pick up the material via a loading tool, and another type of haul machine or device to haul away the material. A significant problem is positioning of the haul machine or device relative to the loading tool in an efficient manner. The present disclosure contemplates that mining operations involve large vehicles and machines, including mining trucks and shovels. Moving such large vehicles is conventionally a time-consuming process due to safety concerns and difficulties in navigating while driving and/or parking.

One use of large vehicles in mining operations includes transporting excavated materials (for example, soil, rock, ore, coal, and/or sand) to locations within and/or away from a mining site. Conventional mining trucks include a cab for the vehicle's operator and a truck body for receiving and hauling material. Many vehicle operations, including aligning a vehicle relative to a shovel to receive material from the shovel (i.e., spotting), involve difficult and/or dangerous maneuvers due to the scale of the machinery involved and the degree (or lack thereof) of visibility for the operator from the cab.

When spotting a large vehicle such as a mining truck near a shovel, which for human-operated vehicles is often accomplished by an iterative process of an operator of the shovel issuing positioning and/or repositioning instructions to an operator of the mining truck, the operator must align the mining truck substantially near and under the shovel to reduce spillage of material during transfer from the shovel to the mining truck's truck body. At the same time, the mining truck operator must be cautious to avoid backing into the shovel during the spotting process. Accidents may occur or respotting may be necessary due to limited visibility and/or lack of operator skill. If an operator requires multiple attempts to properly spot the mining truck under the shovel, time and fuel may be wasted during respotting process. Efficiency may improve with operator experience, with the operation of a give type of haul machine and/or a particular loading site, but there is a very limited supply of very experienced operators. Repositioning the shovel relative to the mining truck is generally a much slower, more impractical, and more dangerous procedure. Automated machines have an added problem of requiring precise position information since an operator is not present. Although GPS may be used to assist in positioning of machines, GPS without corrections lacks the accuracy needed to prevent spilling. Additionally, GPS information is often unavailable or of limited availability at many mining sites.

There are existing techniques for automatically positioning cargo carrying machines with respect to a target. U.S. Pat. No. 7,010,404 to Ichijo et al., for example, relates to a camera being used to pick up an image of a mark, automatically recognizing the mark, determining a position of the camera based on a size and position of the mark within an image captured by the camera, determining a deviation in positions of cargo-handling forks and a target position, and automatically positioning the forks until the deviation becomes zero.

In an effort to increase efficiency of mining operations to avoid wasting time in spotting or respotting machinery for transferring materials, and to reduce accidents arising from such activities, improvements in positioning information and operation, for human-operated, semi-automatic machines, or automatic machines may be beneficial.

SUMMARY

In a first aspect, an example system for assisted positioning of a haul machine at a destination position for receiving materials from a loading machine, the system comprising: at least one perception device included with the haul machine, configured to obtain and provide information reflecting a location or orientation of a first fiducial attached to the loading machine; a communication interface located in haul machine for conveying positioning guidance to a human operator of the haul machine; a processor configured to: determine a location or position of the first fiducial based on the information provided by the at least one perception device; determine the destination position based on the location or position of the first fiducial; issue guidance via the communication interface indicating an adjustment in steering angle based on the determined destination position.

In a second aspect, an example method for assisted positioning of a haul machine at a destination position for receiving materials from a loading machine, the method comprising: obtaining from at least one perception device information reflecting a location or orientation of a first fiducial attached to the loading machine; determining a location or position of the first fiducial based on the information provided by the at least one perception device; determining the destination position based on the location or position of the first fiducial; and issuing guidance to an operator of the haul machine indicating an adjustment in steering angle based on the determined destination position.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
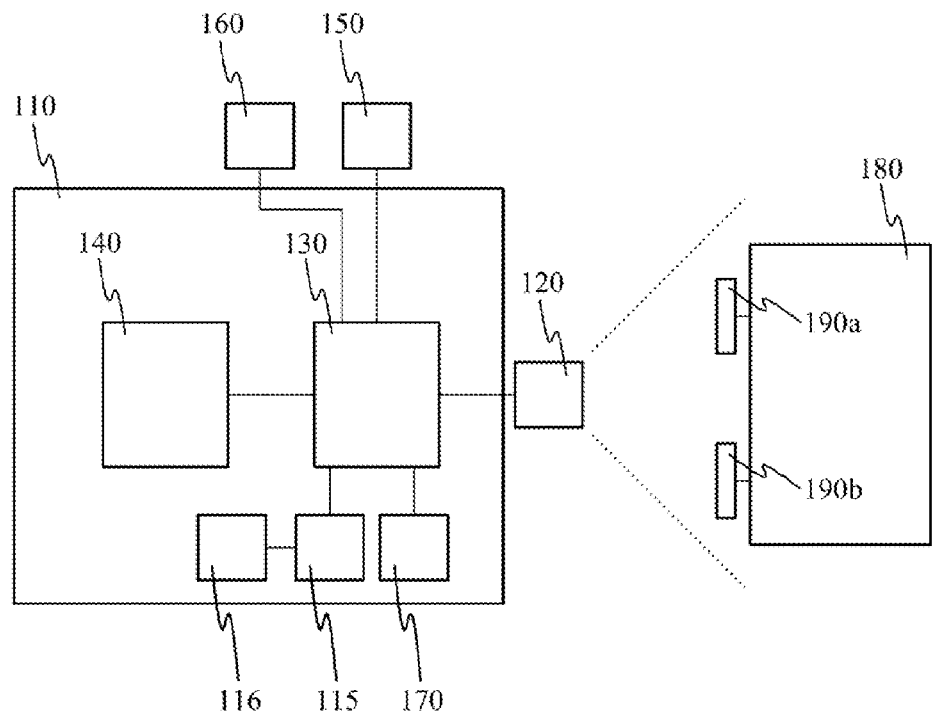
FIG. 1 illustrates a schematic view of a haul machine 110 and related systems for improved positioning of haul machine 110 relative to loading machine 180.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure. For example, this disclosure is generally drawn to methods, systems, devices and/or apparatus related to aligning a mining vehicle, such as a mining truck, with other mining equipment, such as an excavator or wheel loader. However, this disclosure is merely by way of example, and the use of the disclosed subject matter in other contexts is contemplated by, and within the scope of, this disclosure.

Throughout this disclosure, the terms "location" and "position" are used. A "location," in this disclosure, is a point, region, or volume in two- or three-dimensional space. Typically a two-dimensional coordinate, such as a latitude and longitude or distances from a reference point along a pair of orthogonal axes, is used for specifying a location. For example, a location may specify where a machine is or may be situated at a mining site. A "position," in this disclosure, is a location also having a respective orientation for a machine. Typically, a one-dimensional angle relative to a reference direction, such as magnetic or true north or a direction in which a fiducial faces, is used for specifying an orientation of a position. Thus, for example, a "destination position" specifies an expected location for a machine along with an expected orientation for the machine. In contrast, a "destination location" merely specifies an expected location for a machine, but does not expect or require an particular orientation for a machine situated at that location.

FIG. 1 illustrates a schematic view of a haul machine 110 and related systems for improved positioning of haul machine 110 relative to loading machine 180. Examples of loading machine 180 include, but are not limited to, shovels, excavators, wheel loaders, and track loaders. Haul machine 110 includes at least one perception device 120 for detecting the presence of fiducials, such as fiducials 190a and 190b on loading machine 180.

A first example of a perception device 120 is a camera, configured to capture images, and associated program code executed by processor 130 for identifying the presence of at least one fiducial 190a in the field of view of the camera, and determining a distance and orientation of loading machine 180 relative to the fiducial 190a and/or loading machine 180 from at least one image provided by the camera. Processor 130 may be configured to determine an angular position of fiducial 190a relative to haul machine 110 based on the at least one image. The camera may be provided with pan, tilt, and/or zoom (PTZ) capability responsive to commands received from processor 130, and processor 130 may be configured to initially use a wide field of view for identifying candidate fiducials, and command the camera to zoom in to a specific area corresponding to a candidate fiducial 190a to obtain more a more detailed image of fiducial 190a, which may be useful for more reliably confirming a fiducial 190a is present and/or determining an identification associated with a fiducial 190a (for example, fiducial 190a may encode an identifier that identifies one machine from another and/or encode an identifier that identifies a portion of a machine to which it is attached, and processor 130 may be configured to decode this identifier from one or more images obtained via the camera).

A second example of a perception device 120 is a LIDAR (Light Detection And Ranging) unit used to determine a distance and/or orientation of haul machine 110 from one least one fiducial 190a in the field of view of the LIDAR. Retroreflective material is useful for fiducial 190a for the second example to enhance a signal obtained by the LIDAR for fiducial 190a.

A third example of a perception device 120 is a hybrid system of the above first and second examples, using both a camera and a LIDAR. In the third example, the LIDAR provides better accuracy and/or precision for distance information than generally would be obtained via the camera, and the camera can be used to more reliably detect the presence of fiducials and/or determine an identifier associated with a specific fiducial. Processor 130 may be configured to determine a location or position of a fiducial based on a distance obtained by LIDAR and angular position determined via the camera. In an embodiment, similar processing may be performed for the configuration illustrated in FIG. 2, in which perception devices 121 are mounted on loading machine 181 for determining a location or position of haul machine 110 based on fiducials 190c and 190d mounted on haul machine 110.

For a human-operated haul machine 110, a communication interface 140 may be provided for interaction with a human operator, such as, but not limited to, conveying positioning guidance to a human operator of the haul machine. For example, a display, such as an LCD unit, for which processor 130 may be configured to provide a graphical user interface for the display of, for example, general information, such as identifying available loading machines; guidance to the operator for maneuvering haul machine 110 into position for efficient loading by loading machine 180 (for example, see the below discussion of FIGS. 8-10); and for the operator to issue instructions to processor 130 in connection with such guidance, such as indicating a selection of a specific loading machine 180 for which the haul machine 110 should be positioned. Communication interface 140 may also be configured to receive input from a human operator, such as via a touch screen control integrated into a display unit, a keyboard, a mouse or other pointing device, and/or verbal instructions received via a microphone.

In an embodiment, haul machine 110 may include a wireless data communication unit 150. Many wireless data communication technologies are well known in the art and are generally suitable for use in connection with the disclosed subject matter, such as, but not limited to, IEEE 1202.11, cellular data service, wireless mesh networks, and optical data communication, such as via infrared light. Processor 130 may be configured to use wireless data communication unit 150 to exchange data with other machines, such as loading machine 180. Also, processor 130 may be configured to use wireless data communication unit 150 to exchange data with a central computer (not illustrated) which may be configured to determine and/or track what machines, such as haul machine 110 and loading machine 180, are present and/or active at a mining site, and may also be configured to obtain locations or positions for each of the machines. In an embodiment, wireless data communication unit 150 may also serve as a fiducial. For example, with a haul machine 110 communicating with a wireless data communication unit 150 via laser optical communication, haul machine 110 may be able to determine an angular orientation of wireless data communication unit 150 relative to haul machine 110.

Processor 130 may be configured to, via wireless data communication unit 150, provide a present position and/or orientation of haul machine 110 to another machine, such as loading machine 180, or computer capable of data communication via wireless data communication unit 150. Processor 130 may be configured to, via wireless data communication unit 150, provide information describing one or more fiducials attached to haul machine 110. Processor 130 may be configured to, via wireless data communication unit 150, obtain a present position and/or orientation and/or identifier of another machine, such as loading machine 180, or a fiducial. Processor 130 may be configured to, via wireless data communication unit 150, provide an identifier for haul machine 110 to a computer and obtain in response a destination position and orientation for receiving materials from loading machine 180. Processor 130 may be configured to, via wireless data communication unit 150, obtain information describing areas of a mining site haul machine 110 may use for travel.

In an embodiment, instead of directly determining its own location or position, haul machine 110 may omit perception device 120 and include one or more fiducials. Instead of directly determining a current position and/or orientation of haul machine 110, processor 130 may determine current position and/or orientation of haul machine 110 based on information obtained via wireless data communication unit 150. For example, loading machine 180 may include at least one perception device, from which it is configured to determine the relative position and orientation of haul machine 110, which it is further configured to transmit by a wireless data communication unit included in loading machine 180. Processor 130 may be configured to, via wireless data communication unit 150, obtain its relative position and/or orientation provided by loading machine 180 and position or assist in positioning haul machine 110 at a destination position and orientation for receiving materials from loading machine 180 using the obtained position and/or orientation. Alternatively, loading machine 180 may provide position and/or orientation information for detected fiducials to processor 130 via wireless data communication unit 150, and processor 130 is configured to determine a position and/or orientation of haul machine based on the received fiducial position and/or orientation information.

Figure 2:
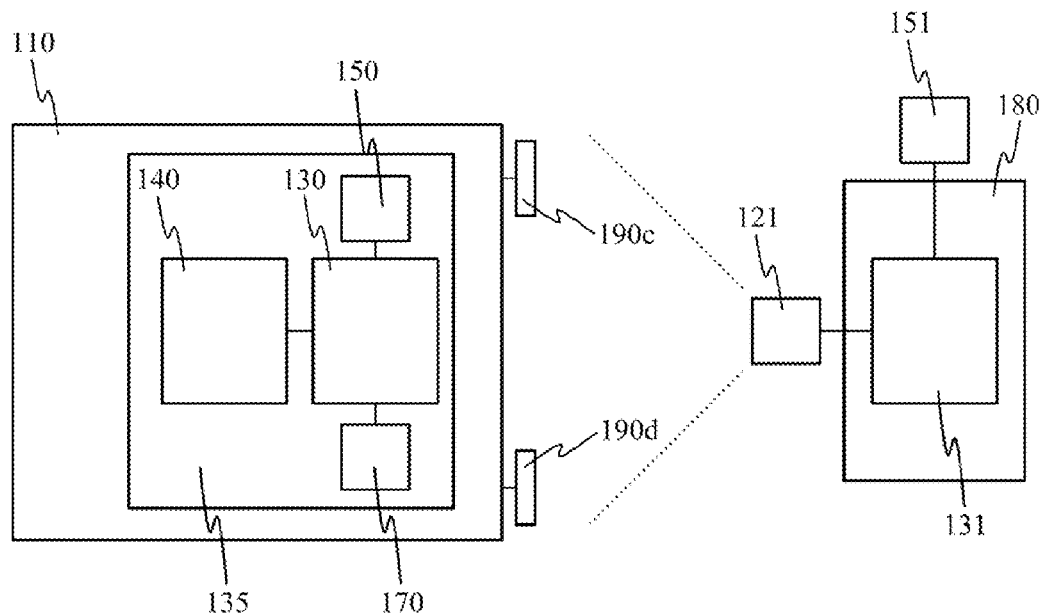
FIG. 2 illustrates an embodiment in which a processor 130, wireless data communication unit 150, communication interface 140, and optionally inertial measurement unit (IMU) 170 are included in a compact portable add-on unit 135.

FIG. 2 illustrates an additional alternative for the preceding embodiment, in which processor 130, wireless data communication unit 150, communication interface 140, and, optionally, inertial measurement unit 170 (discussed in more detail below), are included in a compact portable add-on unit 135 which may be temporarily used in the cab of the haul machine 110. Much as discussed above, loading machine 180 includes a perception device 120 and processor 131 which is configured to determine locations or positions of fiducials 190c and 190d, which have been attached to haul machine 110. Processor 131 is also configured to provide the determined locations or positions of fiducials 190c and 190d via wireless data communication unit 151. Add-on unit 135 obtains the determined locations or positions of fiducials 190c and 190d, and based on these locations or positions, and information recorded in add-on unit 135 about where fiducials 190c and 190d are arranged on haul machine 110, processor 130 is configured to determine a position of haul machine 110 relative to loading machine 180. Processor 130 may also be configured as described in connection with other embodiments of this disclosure, including, for example, processing of information from IMU 170 and/or use of communication interface 140 to assist in positioning haul machine 110 at a destination position and orientation. In an embodiment of add-on unit 135 including IMU 170, add-on unit 135 is preferably rigidly attached to haul machine 110 to obtain more accurate information about the movement of haul machine 110. Processor 130 may also be configured to perform positioning of haul machine 110 by way of a wired or wireless interface with a steering and acceleration control system 115 for haul machine 110. With add-on unit 135, an existing fleet of haul machines may be upgraded with the addition of fiducials 190c and 190d and an add-on unit 135 to each haul machine to perform at least assisted positioning. Additionally, if a phase of operation involves the temporary participation of haul machines from outside of the fleet to haul away a greater than average amount of material, each of the additional haul machines may also be temporarily provided with fiducials 190c and 190d and an add-on unit 135 to provide assisted positioning to operators of these machines.

In an embodiment not illustrated in FIG. 1, both haul machine 110 and loading machine 180 each include at least one perception device, at least one fiducial, and a wireless data communication unit. Processor 130 may be configured to determine a position and orientation of haul machine 110 based on information from an associated perception device. Processor 130 may also be configured to obtain a respective position and/or orientation for haul machine 110 determined and provided by loading machine 180. Processor 130 may be configured to use the obtained information to verify both machines have made similar determinations as to the position and/or orientation, and where different indicate an error if, for example, one of the two determinations indicates a risk of collision between haul machine 110 and loading machine 180.

In an embodiment, haul machine 110 may include a geolocation unit 160, from which processor 130 may obtain an absolute position, typically including latitude, longitude, and altitude, of haul machine 110 on the surface of the Earth. Technologies for geolocation include, but are not limited to, the U.S. Global Positioning System (GPS), the Russian GLONASS satellite-based system, the European Galileo satellite-based system, and radio-positioning systems provided by Locata Corporation of Canberra, Australia. Geolocation unit 160 may be configured to receive and process geolocation signals from multiple systems, to increase robustness and precision in geolocation measurements. Geolocation unit 160 may be configured to perform assisted geolocation techniques using signals received at a known fixed location to provide corrections and greater accuracy for local receivers. Processor 130 may be configured to base its location determination on location information received from geolocation unit 160, although processor 130 may be configured to not use location information received from geolocation unit 160 if its precision or accuracy fail to meet predetermined requirements.

In an embodiment, haul machine 110 may include an inertial measurement unit (IMU) 170, which typically comprises three orthogonally oriented accelerometers for detecting changes in position, three orthogonally oriented gyroscopes for detecting changes in orientation, and, in some cases, three orthogonally oriented magnetometers serving as a three-dimensional electronic compass. Processor 130 may be configured to use information obtained from IMU 170 to confirm and/or more precisely determine changes in position and orientation. As an example, processor 130 may be configured to use information obtained from IMU 170 for determining changes in position and orientation of haul machine 110 between determinations of position and orientation using information obtained from perception device 120, which may be able at a much lower rate than the IMU information.

Although estimating a changed position and orientation over time based only on integrated information from IMU 170 generally will drift from the actual position and orientation due to accumulated errors, the amount of time for such drift to become significant is expected to be longer than a period of time expected for haul machine 110 to be placed in a desired position relative to loading machine 180, and selection of an IMU 170 should be made in view of this consideration. Thus, in an embodiment making use of IMU 170, the number of perception devices 120 and field of view for the perception devices 120 may be reduced, with processor 130 being configured to position or aid in positioning haul machine 110 in a vicinity of loading machine 180 relying on an initial position and orientation determined from information obtained from perception device 120, and subsequent positions and orientations determined from information from IMU 170.

In an embodiment, haul machine 110 may include at least one steering sensor 116, such as cylinder position sensors, configured to determine a steering angle associated with a steering mechanism for haul machine 110. Processor 130 may be configured to obtain the steering angle from steering sensor 116, for example, from a control system 115 for haul machine 110, or directly from steering sensor 116. Processor 130 may be configured to obtain throttle information from control system 115. Processor 130 may be configured to use the obtained steering angle and/or throttle information, with or without information from IMU 170, to determine changes in position and orientation of haul machine 110. Additionally, for assisted or semi-autonomous positioning of haul machine 110, processor 130 may be configured to use the obtained steering angle and/or throttle information to indicate suggested changes in steering and throttling to a human operator for positioning of haul machine 110.

In an embodiment, haul machine 110 may be human-operated, semi-autonomously, and/or autonomously driven, with control system 115 configured to control steering, a transmission or other drive system, throttling, and/or braking of haul machine 110. Processor 130 may be configured to issue instructions to control system 115 to perform automated or semi-automated positioning of haul machine 110. Example haul machine operations that the processor 130 may instruct may include stopping the haul machine 110, reversing the haul machine 110, decelerating the haul machine 110, accelerating the haul machine 110, and/or steering the haul machine 110. For example, processor 130 may be configured to communicate with an electronic control module (not illustrated) included in control system 115 via a protocol such as OBDII. In one example, a processor 130 in a human-operated haul machine 110 may be configured to, once haul machine 110 has been positioned by a human operator in the vicinity of loading machine 180, receive an indication from the human operator that processor 130 should perform automated or semi-automated positioning of haul machine 110, after which processor 130 issues instructions to control system 115 to complete positioning of haul machine at a target destination position. Processor 130 may also be configured to receive an indication from the human operator that automated or semi-automated positioning should be terminated, in response to which processor 130 issues instructions to control system 115 for rapid and safe stopping of haul machine 110.

Figure 3:
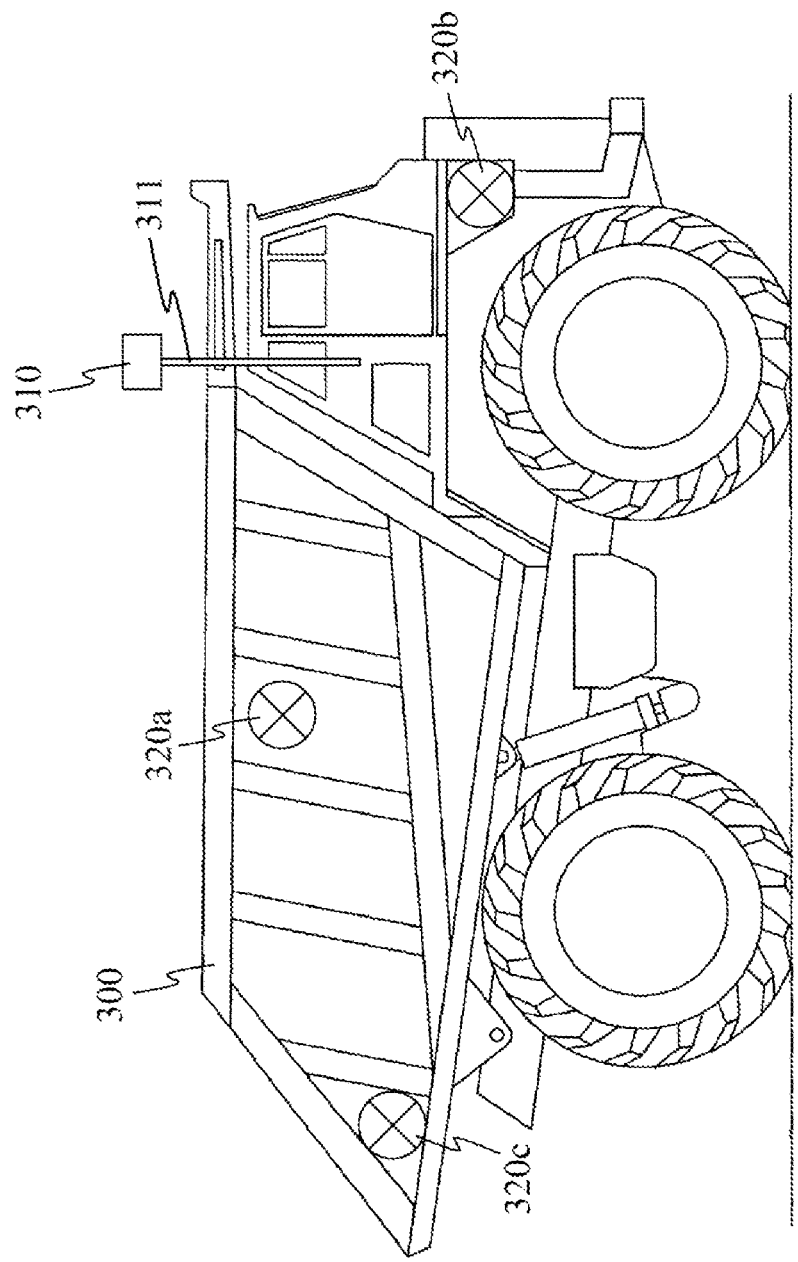
FIG. 3 illustrates an example of a haul machine 110.

FIG. 3 illustrates an example of a haul machine 110. Specifically, FIG. 3 illustrates a large mining truck 300. Mining truck 300 may include perception system 310, which includes at least one perception device 120 for identifying and/or locating fiducials. In FIG. 3, perception system 310 is mounted on a pole 311 to the exterior of mining truck 300, providing an elevated view for perception system 310 which may provide a greater field of view for perception devices 120 included in perception system 310. In an embodiment, perception system 310 may include a fiducial (not illustrated) on its exterior for determining a position and/or identification of mining truck 300 using a perception device such as perception device 121 illustrated in FIG. 2. In an embodiment, a second perception system 310 may be mounted on the opposite side of mining truck 300, with each perception system 310 having approximately a 180 degree field of view, such that the perception systems 310 mounted on mining truck 300 provide a complete field of view all around mining truck 300. In an embodiment, one or more perception devices 120 may be mounted directly on or in the exterior surface of mining truck 300 In an embodiment, a plurality of perception devices 120 mounted directly on or in the exterior surface of mining truck 300 may be arranged at various points around the exterior surface of mining truck 300 to provide a complete or more complete field of view all around mining truck 300.

In an embodiment, mining truck 300 may include one or more fiducials, such as fiducials 320a, 320b, and 320c illustrated in FIG. 3. These fiducials may be used for determining a location or position of mining truck 300, much as described in connection with FIG. 2 above. Typically, the fiducials are placed at predetermined points on the exterior of mining truck 300, and information describing these placements may be known and/or obtained for processing information obtained by one or more perception devices 120 (not illustrated), such that the placement information can be used to determine a location or position of mining truck 300 as a whole based on determined locations or positions of the fiducials. In some cases, information for a plurality of fiducials within the field of vision of the one or more perception devices 120 and information describing placements of fiducials on mining truck 300 may be used to determine distance and/or orientation information for mining truck 300. For example, fiducials 320b and 320c may be placed on mining truck 300, and placed likewise on other mining trucks of the same model, such that they may be placed at the greatest distance apart from each other while maintaining a minimum size for the fiducials. In an embodiment, a fiducial may be placed on mining truck 300 to indicate the location or position of a particular feature or area of mining truck 300. For example, fiducial 320a may be placed at the desired horizontal position for a bucket (not illustrated) of a loading machine 180 for depositing materials in mining truck 300. Fiducial 320a thus positioned can be used not only for determining a position and/or orientation of mining truck 300 as a whole, but also may be used by a loading machine 180 configured to automatically or semi-automatically horizontally orient a bucket of the loading machine 180 before depositing materials into mining truck 300.

Figure 4:
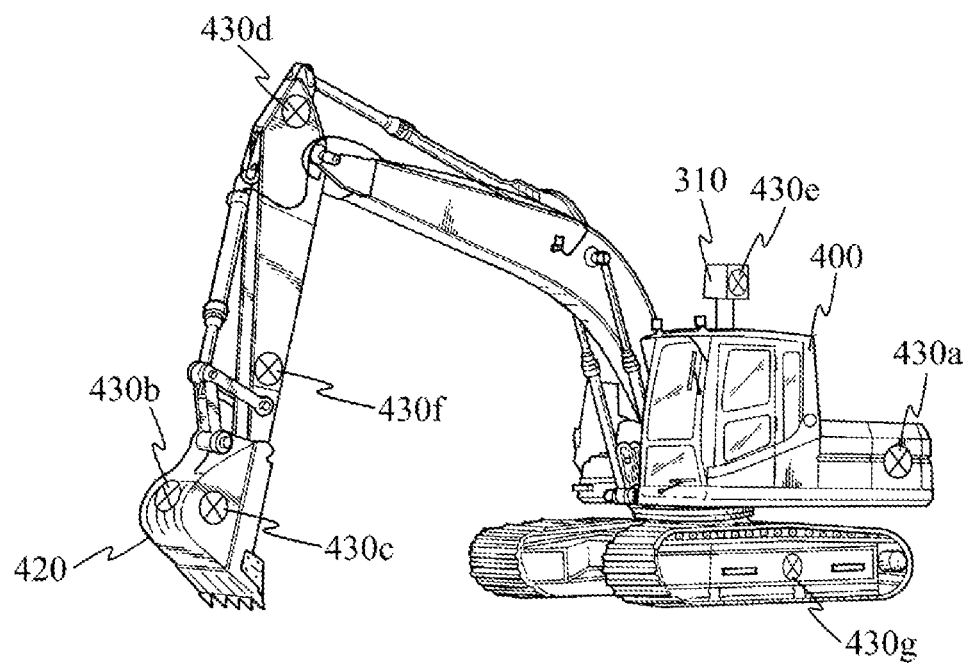
FIG. 4 illustrates an excavator 400.
Figure 5:
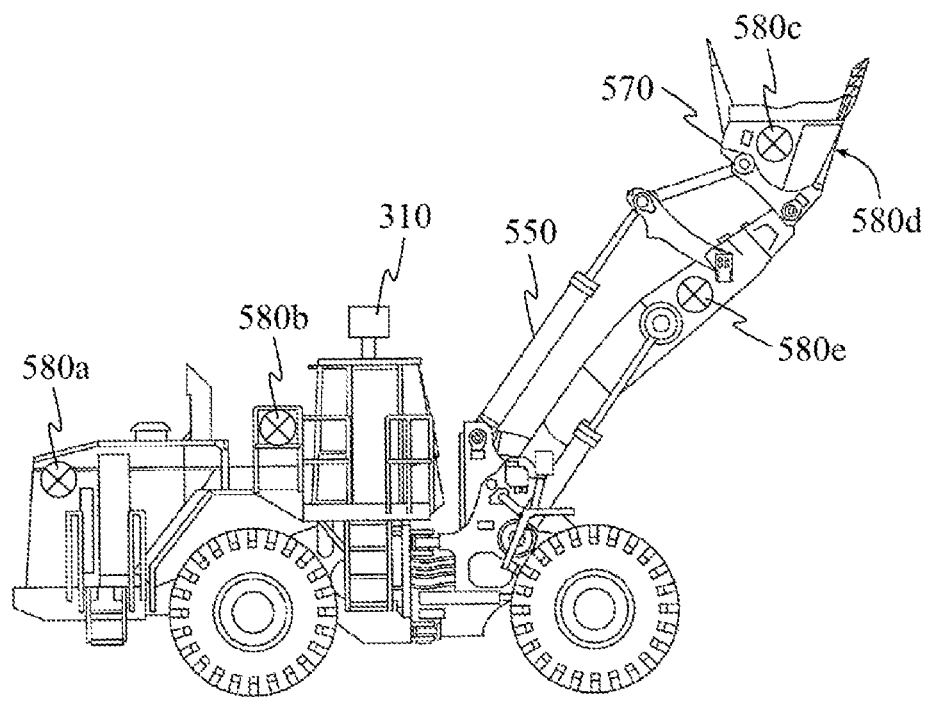
FIG. 5 illustrates a wheel loader 550.

FIGS. 4 and 5 illustrate examples of loading machines, such as loading machines 180 and 181 illustrated in FIGS. 1 and 2. Other types and models of loading machines, whether at fixed positions or mobile, are contemplated as within the scope of this disclosure, and may also apply the various features described in connection with the various embodiments described connection with loading machine 180, loading machine 181, excavator 400, and wheel loader 550.

FIG. 4 illustrates an excavator 400. A common use pattern for excavator 400 is to place excavator 400 at a fixed position for a period of time while performing multiple sequences of digging with and filling bucket 420 and depositing the contents of the bucket 420 into a haul machine at a destination location (not illustrated) for receiving materials from excavator 400. This destination position relative and adjacent to excavator 400 will generally remain fixed for some time. In some cases, two or more destination positions adjacent to excavator 400, such as on opposite sides of excavator 400, may be defined to allow for a second haul machine to already be in position immediately after a first haul machine has been filled by excavator 400, to "ping pong" haul machines for more efficient use of excavator 400.

Excavator 400 may include one or more perception systems 310, configured much as described above with respect to the use of perception system 310 for mining truck 300 illustrated in FIG. 3. In the embodiment illustrated in FIG. 4, a fiducial 430e is included on the exterior of perception system 310. In an embodiment, perception system 310 is on an elevated mounting directly above a human operator position, or slightly behind such a placement. With such a placement, perception system 310 may have a complete field of view all around excavator 400, with the exception of the main boom and, depending on their actuation, the stick and bucket 420. In an embodiment, one or more perception devices 120 (not illustrated) may be arranged at various positions on excavator 400 to provide a complete or more complete field of view all around excavator 400.

In an embodiment, there may be one or more fiducials mounted on excavator 400, such as fiducials 430a, 430b, 430c, 430d, 430e, 430f, and 430g. Although illustrated as mounted on perception system 310, fiducial 430e, or many of the other fiducials described in this application, may have an elevated mounting solely for fiducial 430e, to make the fiducial generally more visible. Fiducial 430a is mounted on the housing of excavator 400. Fiducials 430b and 430c are mounted on bucket 420 to provide an indication of where bucket 420 is positioned. In an embodiment, haul machine 110 may be configured to use fiducials 430b and 430c to ensure precise positioning of haul machine 110 under bucket 420. In an embodiment, fiducial 430b may encode an identifier which may be used by processor 130 to distinguish fiducial 430b from another fiducial as being mounted on bucket 420. However, in many cases fiducials 430b and 430c are ineffective, as bucket 420 is subjected to harsh conditions for digging and other activities, which tend to damage fiducials or obscure fiducials with dirt or mud. Because of this, fiducials 430d and 430f, positioned on the stick of excavator 400, illustrate better placement. Fiducial 430f is placed near bucket 420 where it will not be obstructed by components of excavator 400, and may be used to determine an approximate location of bucket 420. Fiducial 430d is placed at the other end of the stick, which may provide an easily visible fiducial for excavator 400 due to the height of the placement. Together, fiducials 430d and 430f may be used to determine the positioning of the stick of the excavator 400, and thereby estimate the position of bucket 420. In an embodiment in which excavator 400 is able to transmit information received by haul machine 110 via wireless data communication unit 150, excavator 400 may be configured to determine actuation information for bucket 420 such as a position, elevation, and/or orientation of bucket 420 and communicate the bucket actuation information to haul machine 110, and processor 130 may be configured to determine an appropriate position and/or orientation for haul machine 110 to receive materials from bucket 420. Fiducial 430g is placed on a portion of an undercarriage of excavator 400 which does not rotate with the upper portion of excavator 400.

FIG. 5 illustrates a wheel loader 550. A significant difference from excavator 400 is that wheel loader 550 is more maneuverable, as it generally travels about on its wheels, both for filling bucket 570 with materials and for positioning wheel loader 550 prior to depositing materials from bucket 570 into or onto a haul machine. Thus, in some cases a location and/or orientation of haul machine 110 at a destination position or location may in general be less precise than for excavator 400, as wheel loader 550 can be maneuvered to meet the actual position of haul machine 110. In other cases, such as where both haul machine 110 and wheel loader 550 are configured to perform automated, semi-automated, and/or assisted positioning, both haul machine 110 and wheel loader 550 may be expected to meet more precisely at a common destination location (not illustrated), which may facilitate a more efficient transfer of materials from wheel loader 550 to haul machine 110. As with mining truck 300 and excavator 400 illustrated in FIGS. 3 and 4 and described above, wheel loader 550 may include one or more perception systems 310. In an embodiment, one or more perception devices 120 may be arranged at various positions on wheel loader 550 to provide a complete field of view all around excavator 400 or a partial field of view.

Much as discussed with respect to excavator 400, in an embodiment, there may be one or more fiducials mounted on wheel loader 550, such as fiducials 580a, 580b, 580c, and 580d. Fiducial 580d is placed on the forward-facing side of bucket 570. Fiducials 580a and 580b are mounted on a main body of wheel loader 550. Fiducials 580c and 580d are mounted on bucket 570 to provide an indication of where bucket 570 is positioned. However, as discussed in connection with fiducials 430b and 430c on excavator 400, in many cases fiducials 580c and 580d are ineffective, as bucket 570 is subjected to harsh conditions for loading bucket 570, which tend to damage fiducials or obscure fiducials with dirt or mud. Because of this, fiducial 580e, positioned on a boom of wheel loader 550, illustrates a better placement. With other fiducials on wheel loader 550, fiducials 580e may be used to estimate the position of bucket 570.

Figure 6:
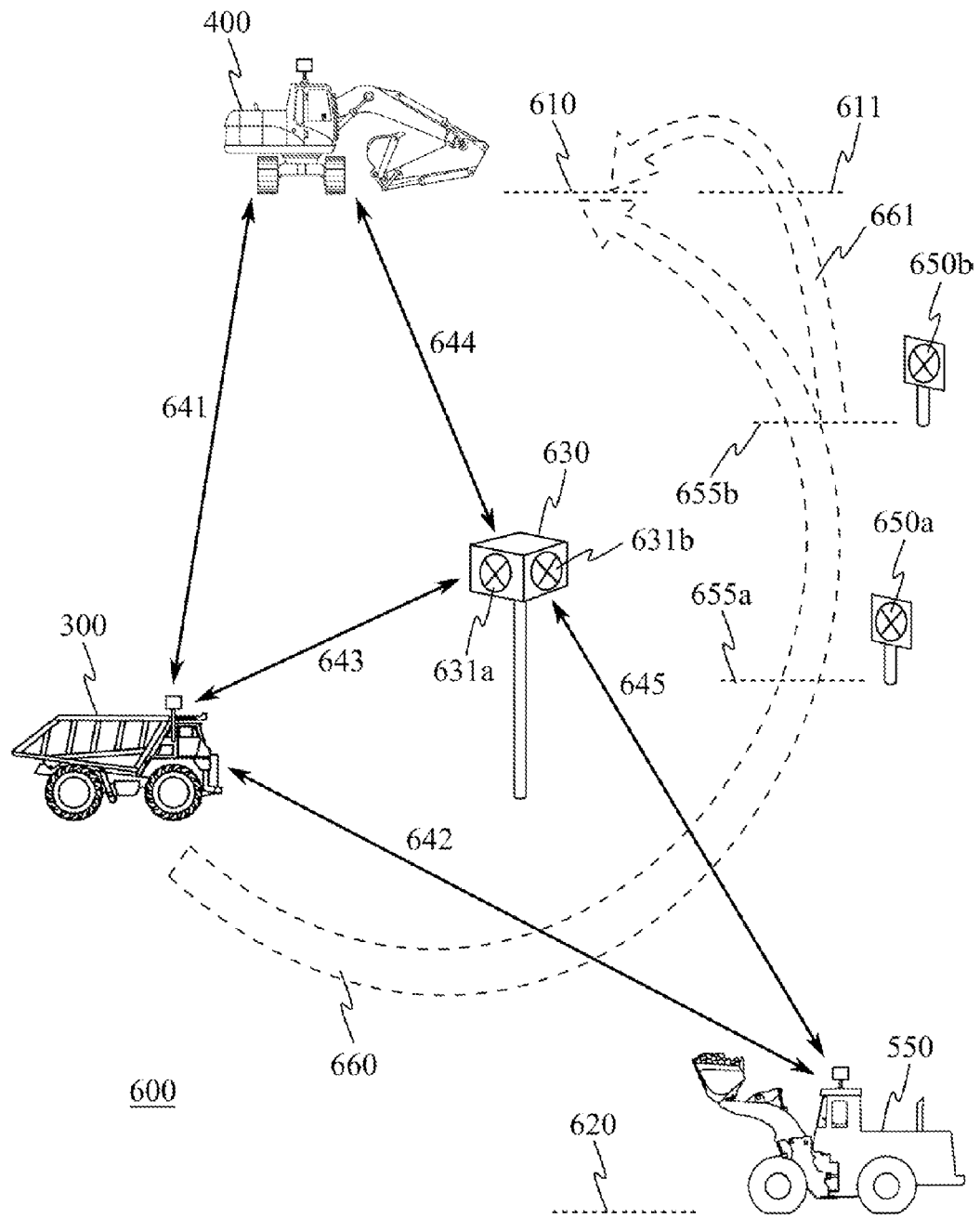
FIG. 6 illustrates machines, equipment, and other features at a mining site 600.

FIG. 6 illustrates machines, equipment, and other features at a mining site 600. After arriving at mining site 600, mining truck 300 may receive materials from excavator 400 and/or wheel loader 550. In the event that mining truck 300 is to receive materials from excavator 400, processor 130 may be configured to perform assisted or automated positioning of mining truck 300 at destination position 610 designated for receiving materials from excavator 400. Processor 130 may be further configured to obtain information from a fiducial mounted on excavator 400, and visible along line of sight 641, via perception device 120. In the event that mining truck 300 is to receive materials from wheel loader 550, processor 130 may be configured to perform assisted or automated positioning of mining truck 300 at destination position 620 designated for receiving materials from wheel loader 550. Processor 130 may be further configured to obtain fiducial information mounted on wheel loader 550, and visible along line of sight 642, via perception device 120.

In an embodiment, a reference location 630 may be indicated by one or more fiducials 631a and 631b, and the reference location used by haul machines and/or loading machines for their positioning. For example, in addition to, or as an alternative to, having a fiducial mounted on excavator 400, processor 130 may be configured to obtain information from fiducial 631*a*, visible along line of sight 643, via perception device 120 for determining a location or position of mining truck 300 and assisted or automated positioning of mining truck 300 at destination position 610. Additionally, excavator 400 may be configured to determine its own position by use of a fiducial on reference location 630 visible along line of sight 644, and excavator 400 may be configured to report to mining truck 300, for example via a wireless data communication unit 150, destination position 610 relative to reference location 630. Additionally, wheel loader 550 may be configured to determine its own position by use of fiducial 631*b* on reference location 630 visible along line of sight 645, and wheel loader 550 may be configured to report to mining truck 300, for example via a wireless data communication unit 150, destination position 620 relative to reference location 630. In an embodiment, fiducials 631*a* and 631*b* may also be used to determine a reference direction for orientation. In an embodiment, there may be more than one reference location 630 to provide effective coverage throughout mining site 600.

In an embodiment, reference location 630 may also, or alternatively, include a processor and one or more perception devices 120 (not illustrated) for determining locations or positions of mining vehicles bearing fiducials, such as, for example, haul machine 110 illustrated in FIG. 2, mining truck 300 including one or more fiducials 320*a*, 320*b*, and 320*b*, excavator 400 including one or more fiducials 430*a*, 430*b*, 430*c*, 430*d*, 430*e*, and 600*f*, or wheel loader 550 including one or more fiducials 580*a*, 580*b*, 580*c*, and 580*d*. Reference location 630 may also include a wireless data communication unit (not illustrated), suitable for communication with a processor 130 in mining truck 300 via wireless data communication unit 150. The processor for reference location 630 may be configured to, for example, provide processor 130 with its position and/or provide location or location information for machines and destination locations or positions at mining site 600. Also, the processor for reference location 630 may be configured to receive information about excavator 400 and its associated destination position 610 from excavator 400 via the wireless data communication unit for reference location 630. Thus, the processor for reference location 630 may be used as a central point of communication for activities of machines at mining site 600. In another embodiment, such information may instead be exchanged between and/or among the machines via wireless data communication, for example.

In an embodiment, mining site 600 also includes fiducials 650*a* and 650*b*, with respectively defined destination locations 655*a* and 655*b*, and typically not attached to any mining machine. In an embodiment, fiducial 650*a* may indicate a relative location from a location or position of fiducial 650*a* for destination location 655*a*. For example, a relative location may be encoded into features of fiducial 650*a*, and processor 130 may be configured to decode the relative location based on information obtained via a perception device 120, and also configured to determine a destination location based on a position (including a direction in which fiducial 650*a* is oriented). A similar encoding scheme may also be employed for a fiducial attached to, or positioned near, a loading machine to indicate where a destination location or position for a haul machine to receive materials from the loading machine. In another example, fiducials 650*a* and 650*b* may be identical, and processor 130 configured to treat fiducial 650*a* as indicating destination location 655*a* is located directly in front of fiducial 650*a*. Processor 130 may be configured to treat destination location 655*a* as having a respective position, but not requiring any particular orientation for a machine therein. In an embodiment, destination locations 655*a* and 655*b* may be used to specify waypoints for defining a route 660 between an initial position of mining truck 300 and destination position 610, which may be obtained by mining truck 300 via, for example, a wireless data communication unit 150. In a first example, from the initial position of mining truck 300 illustrated in FIG. 6, processor 130 may be configured to perform assisted or automated positioning of mining truck 300 at destination location 655*a*, then to destination location 655*b*, and then to destination position 610 designated for receiving materials from excavator 400. Such a use of fiducials to designate waypoints may be useful for defining a safe route for mining truck 300 to travel through mining site 600 and/or provide intermediate fiducials for guiding mining truck 300 to excavator 400 in a situation where mining truck does not initially have an available line of sight for detecting a fiducial attached to excavator 400.

In a second example, there may be a second destination location or position 611 designated for excavator 400, and rather than proceed directly from destination location 655*b* to destination position 610, mining truck 300 may be instructed to proceed along route 661, whereby processor 130 is configured to perform assisted or automated positioning of mining truck 300 at destination location or position 611, where it waits for another mining truck (not illustrated) to complete or nearly complete receiving materials from excavator 400, at which time processor 130 is configured to perform assisted or automated positioning of mining truck 300 at destination position 610 designated for receiving materials from excavator 400. Route 661 and destination location or position 611 allow for mining trucks to be safely queued for more efficient operation of excavator 400.

Figure 7:
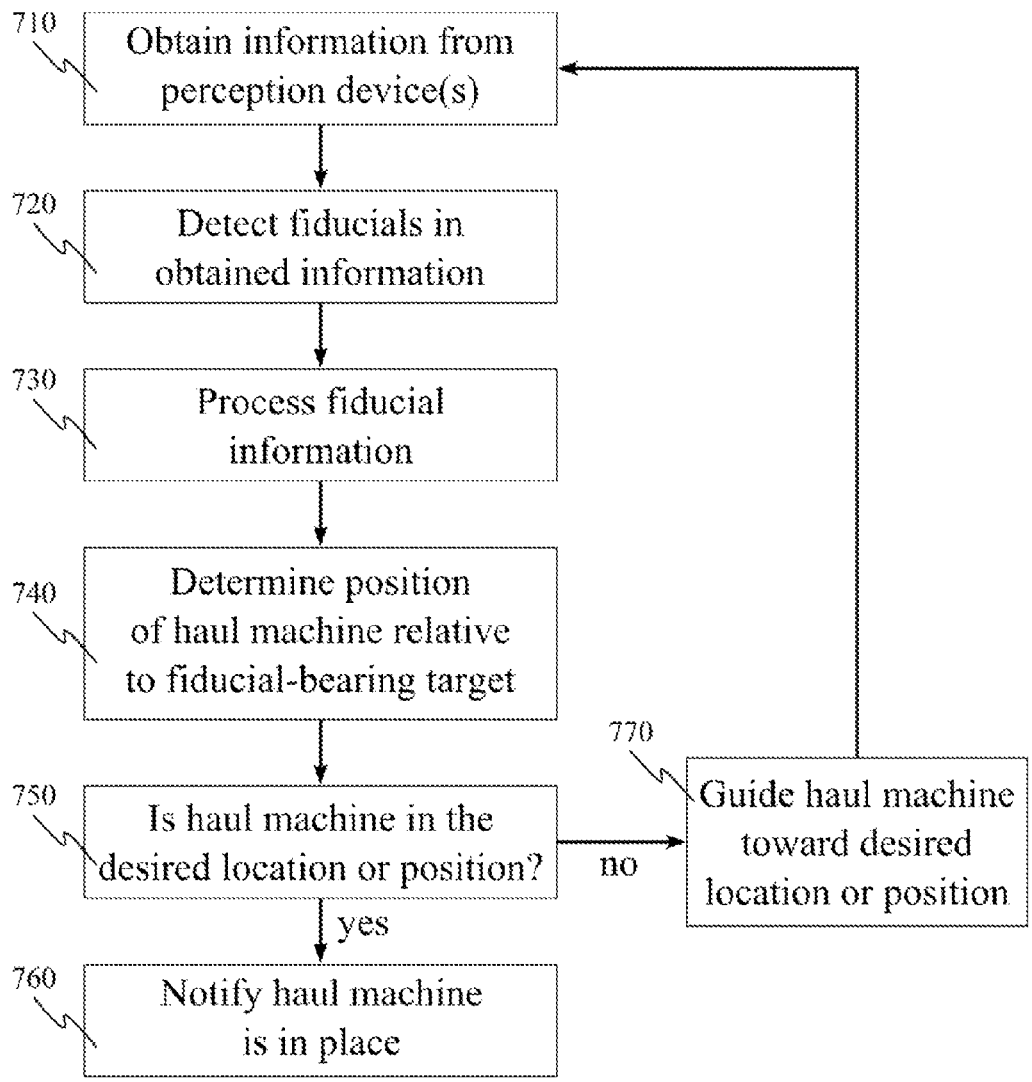
FIG. 7 illustrates operations which processor 130 in FIG. 1 may be configured to perform for assisted or automated positioning of haul machine 110.

FIG. 7 illustrates operations which processor 130 in FIG. 1 may be configured to perform for assisted or automated positioning of haul machine 110 at a desired location or position, such as destination position 620 adjacent to excavator 400 in FIG. 6. At step 710, processor 130 obtains information from one or more perception devices 120 attached to haul machine 110. At step 720, processor 130 detects fiducials indicated by the information obtained in step 710.

At step 730, processor 130 processes information for the fiducials detected in step 720. This information may either be included in or directly determined from the information obtained in step 710. For example, for some fiducials and perception devices, an estimate of distance and/or orientation of a fiducial can be determined from information provided by a perception device 120. In another example, a fiducial may include features which encode information, such as an identifier string which may be used in connection with other information to determine information about the fiducial or a machine to which it is attached. Additionally, processor 130 may obtain other information in connection with the fiducials detected in step 720. For example, where a fiducial encodes information, such as an identifier, that information may be used to look up information, such as information specifying a destination location for a machine on which a fiducial is attached, recorded with processor 130 or available via, for example, wireless data communication unit 150.

At step 740, processor 130 determines a position of haul machine 110 relative to a fiducial-bearing target. Alternatively, processor 130 may be configured to determine a position of haul machine 110 relative to a destination position or location, such as destination position 610 for excavator 400 illustrated in FIG. 6. In an embodiment, processor 130 may be configured to automatically determine a destination location or position based on a determined position or location of a fiducial or loading machine (which may have been determined from fiducials attached to the machine). For example, where processor 130 determines excavator 400 is an excavator of a given model, and also determines an orientation of the excavator 400, processor 130 may be configured to automatically determine a destination position that is a fixed distance in a particular orientation relative to a determined orientation of the excavator 400.

At step 750, processor 130 determines if haul machine 110 is in the desired location or position. This may include determining a distance between haul machine 110 and a destination location or position, and determining whether the distance is within a particular range. In an embodiment, this range may vary from one destination location or position to another. For example, a specification of a destination location or position may expressly indicate an acceptable amount of location error. In another example, the range may be determined based upon characteristics of a loading machine associated with a destination location, where a greater range may be determined for wheel loader 550 over excavator 400 in view of its greater maneuverability.

Where a particular orientation is desired, such as an orientation for a destination position, processor 130 may determine a difference or otherwise compare a current orientation of haul machine 110 against that of the desired orientation, and determining whether the difference is within a particular range. For a destination location, the orientation of haul machine 110 does not need to be considered to determine if haul machine 110 is in the desired destination location. In an embodiment, this range may vary from one destination position to another. For example, a specification of a destination position may expressly indicate an acceptable amount of orientation error. In another example, the range may be determined based upon characteristics of a loading machine associated with a destination location, where a greater range may be determined for wheel loader 550 over excavator 400 in view of its greater maneuverability.

If processor 130 determines that haul machine 110 is in the desired location or position, it proceeds to step 760, in which an operator may be notified that haul machine 110 is in place. In an embodiment, processor 130 may be configured to issue the notification via communication interface 140, as illustrated in FIG. 10.

Figure 9:
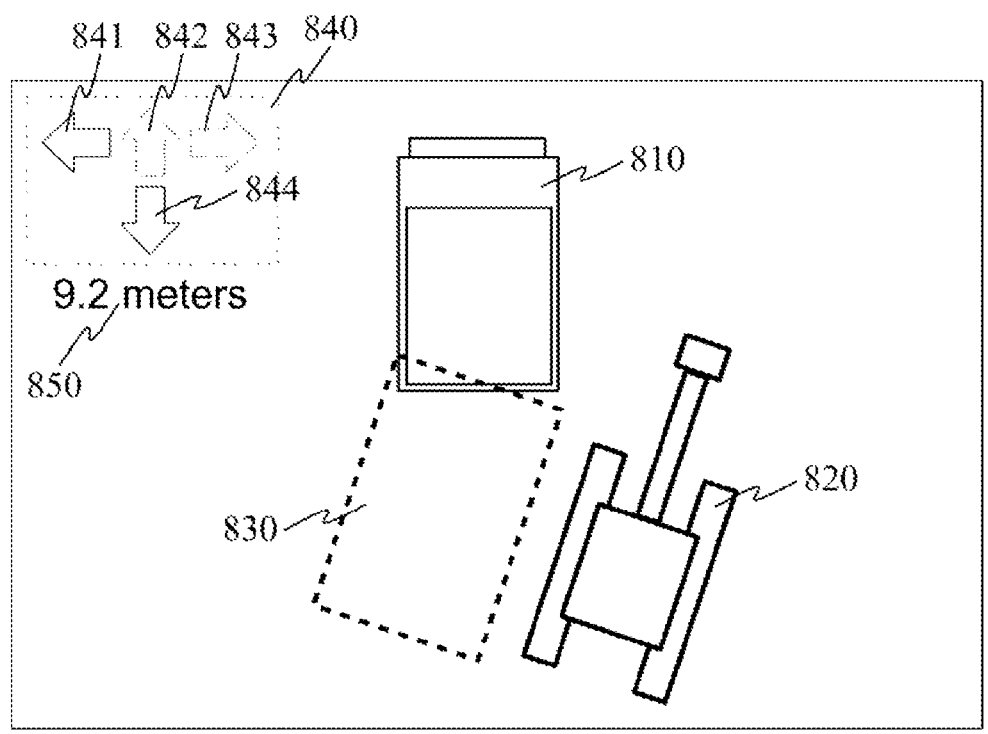

If processor 130 determines that haul machine 110 is not in the desired location or position, it proceeds to step 770, in which processor 130 assists with or automatically guides haul machine 110 toward the desired destination location or position. This may be based in information determined in step 750 about the locations and orientations of haul machine 110 and the desired destination location or position. FIG. 9 illustrates an embodiment in which processor 130 is configured to perform assisted guidance to a destination position via a graphical user interface provided using communication interface 140.

Figure 8:
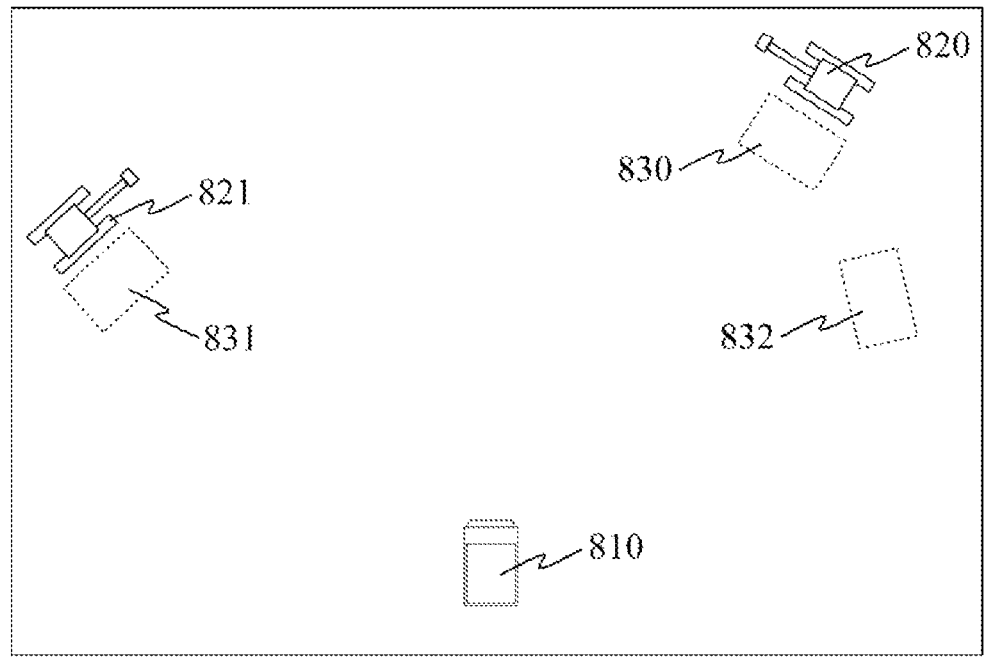
FIGS. 8-10 illustrate operation of a graphical user interface (GUI) provided for assisted guidance of haul machine 110 to a desired destination position.
Figure 10:
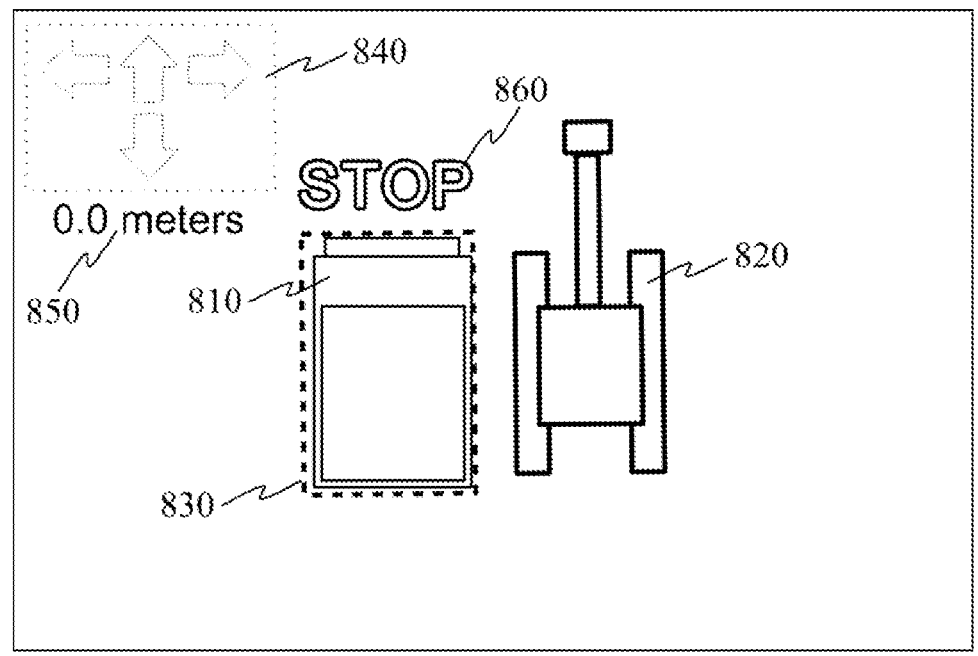

FIGS. 8-10 illustrate operation of a graphical user interface (GUI) provided by processor 130 via communication interface 140, such as an LCD display unit, for assisted guidance of haul machine 110 to a desired destination position. FIGS. 8-10 illustrate the GUI providing an overhead or top-down view of haul machine 110 and items of interest in its vicinity, although other views may be provided. In FIGS. 8-10, haul machine 110 is represented by haul machine outline 810, illustrating haul machine 110 within its surrounding environment. In the GUI, haul machine outline 810 is usually oriented with the front of the haul machine toward the top of the GUI display area. As haul machine 110 turns, haul machine outline 810 continues to be oriented as illustrated in FIGS. 8-10, and indicators of the surrounding environment instead rotate around haul machine outline 810. Presented this way, the operator more intuitively understands where items shown in the GUI are relative to the operator and haul machine 110. FIGS. 8-10 illustrate that haul machine outline 810 may be presented with varying size and varying location within the GUI, although typically the location is only changed along the vertical axis, as a location centered along the horizontal axis more clearly maintains focus on haul machine outline 810. The scale of representation of haul machine 110 and its environment also varies. Generally, processor 130 may be configured to have haul machine outline 810 be displayed as large as possible (although there may be an upper limit on this size) while displaying other surrounding items of particular interest. For example, a large area is shown in the GUI in FIG. 8, as the surrounding items of interest are at some distance away. In contrast, a much smaller area is presented in the GUIs illustrated in FIGS. 9 and 10, as once haul machine is near a desired destination position or location, primarily the other items of interest are the desired destination position or location and any associated loading machine.

FIG. 8 illustrates a GUI interface that the operator of haul machine 110 may use to identify a desired destination position or location. Displayed within the GUI are haul machine outline 810 (corresponding to haul machine 110), loading machine outline 820 (which might correspond, for example, to excavator 400 illustrated in FIG. 6) and its associated destination position outline 830, and loading machine outline 821 (which might correspond, for example, to wheel loader 550 illustrated in FIG. 6) and its associated destination position outline 831. Also displayed in GUI is destination position outline 832, which in this example illustrates a secondary destination position associated with loading machine outline 820, much like destination position or location 611 illustrated in FIG. 6. In the view presented in FIG. 8, the outlines may not be presented to scale to allow them to be more easily viewed and selected by the operator of haul machine 110. For example, if the actual distance between haul machine 110 and the loading machine corresponding to loading machine outline 820 were on the order of a kilometer, a to-scale representation of the machines would be too small to be useful, so a minimum size may be specified for the outlines 810, 820, 821, 830, 831, and 832.

In an embodiment, the GUI illustrated in FIG. 8 may allow the operator of haul machine 110 to identify a desired destination position by way of input provided via communication interface 140. For example, communication interface 140 might include a touchscreen interface, by which the operator may simply touch within the displayed destination position outline 830 to indicate it as the desired destination position for processor 130 to provide guidance. In an embodiment, other interfaces may be provided for identifying a desired destination position or location, including destination positions or locations not presently displayed in the GUI, such as, but not limited to, a pull-down menu or a scrollable list. A hierarchical presentation of groups or classes of loading machines may be provided, to allow the operator to more quickly find and identify a desired loading machine and an associated destination position or location. Additionally, a search function may be provided. Once a desired destination position or location is identified, such as the destination position corresponding to destination position outline 830, as illustrated in FIGS. 9 and 10, processor 130 may be configured to switch GUI to operate in the mode illustrated in FIG. 9. In an embodiment, the desired destination position or location may be automatically identified without any action by the operator. In an embodiment, processor 130 may be configured to automatically identify the nearest destination position or location as the desired destination position or location, once it is within a predetermined distance from haul machine 110.

FIG. 9 illustrates a GUI provided by processor 130 for assisted guidance of haul machine 110 (represented by haul machine outline 810, although a different graphic element may be used) to a desired destination position (represented by destination location outline 830, although a different graphic element may be used) associated with a loading machine (illustrated by loading machine outline 820, although a different graphic element may be used). In an embodiment, also included is navigation guide 840, including left turning navigation indicator 841, forward navigation indicator 842, right turning navigation indicator 843, and reverse navigation indicator 844. Processor 130 may be configured to display or not display navigation indicators 841-844 (for example, in FIG. 9, navigation indicators 841 and 844 are being displayed, while navigation indicators 842 and 843 are not being displayed. Processor 130 may be configured to determine how haul machine 110 should be maneuvered (for example, forward or reverse travel, and an angle or actuation for steering) into position at the desired destination position. In the example illustrated in FIG. 9, the displaying of left turning navigation indicator 841 is used to suggest that the operator turn the steering further to the left, such as by rotating a steering wheel counterclockwise. Likewise, displaying of right turning navigation indicator 843 would be used to suggest that the operator turn the steering further to the right, such as by rotating a steering wheel clockwise. In an embodiment, processor 130 may be configured to obtain information from steering sensor 116, determine a degree of actuation to correct positioning of haul machine 110, and use left turning navigation indicator 841 and right turning navigation indicator 843 to indicate adjustments in steering angle to an operator. Forward navigation indicator 842 and reverse navigation indicator 844 simply indicate whether processor 130 suggests forward or reverse travel of haul machine 110. In an embodiment, processor 130 may be configured to include distance indicator 850, which indicates a calculated distance between the current position of haul machine 110 and the desired destination position.

FIG. 10 illustrates the GUI of FIG. 9 in a situation in which haul machine 110 has been properly positioned in its desired destination location. At that point, processor 130 may be configured to display stop indicator 860 to notify the operator that the haul machine has been properly positioned. As illustrated by FIG. 10, in which the orientations of outlines 810 and 830 are not the same, processor 130 may be configured to allow an amount of mispositioning, whether in location and/or orientation, and still consider a haul machine to be properly positioned. Processor 130 may be configured to display stop indicator 860 before haul machine 110 has fully arrived at the desired destination location to account for a reaction time of the operator. In an embodiment, processor 130 may be configured to automatically stop haul machine 110 if, via the information obtained from nearby fiducials or other sources, processor 130 anticipates haul machine 110 may collide with something, such as a loading machine associated with the desired destination location.

In an embodiment, one or more of the GUIs illustrated in FIGS. 8-10 may display other environmental features of interest. Processor 130 may be configured to display, for example, a line indicating a suggested route through mining site 600, locations and possibly outlines of obstacles, and indications of areas that are unsafe for travel with haul machine 110

Figure 11:
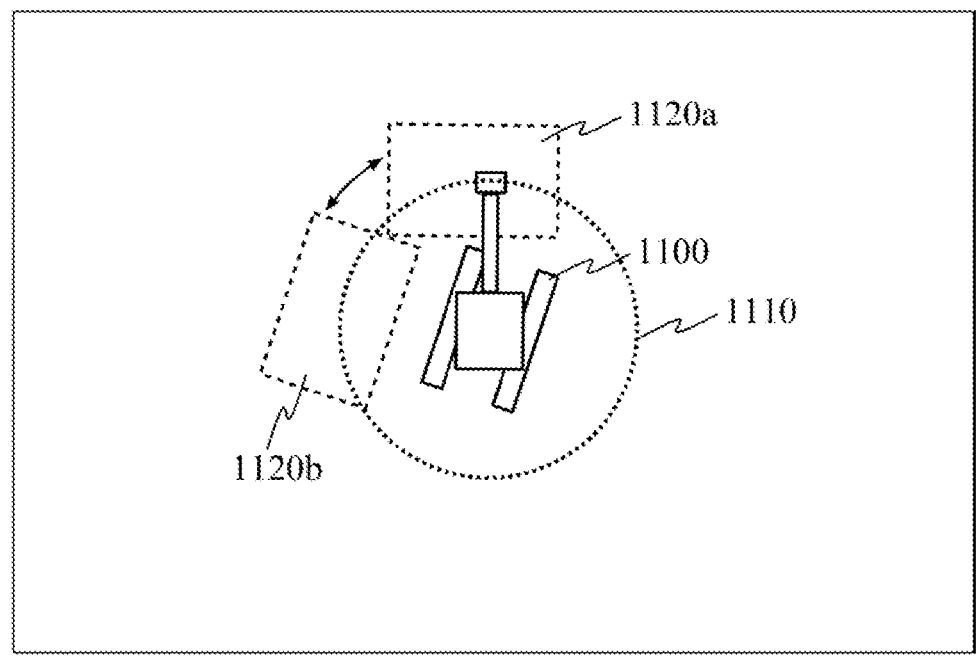
FIG. 11 illustrates a GUI which may be provided to a loading machine operator to specify a destination location or position for haul machines.

FIG. 11 illustrates a GUI which may be provided to a loading machine operator to specify a destination location or position for haul machines. FIG. 11 illustrates an excavator outline 1100, and a bucket outline 1110, illustrating various positions for a bucket of the excavator represented by the excavator outline 1100 to deposit materials. Using the illustrated GUI, the loading machine operator can select various desired positions, such as the positions illustrated with outlines 1120*a* and 1120*b*. This information may be communicated to haul machine 110 for appropriate positioning.

In an embodiment, once a haul machine has been positioned for successful transfer of materials from a loading machine to a haul machine (not illustrated), the position or location of the haul machine may be recorded as a destination position or location to be used for subsequent transfers. With reference to FIG. 11, if the excavator represented by the excavator outline 1100 were presently loading a haul machine at destination position 1120*a*, the operator of the excavator could identify destination position 1120*a* for later transfers. This allows for quick reuse of a destination position or location by the same or other haul machines. In an embodiment, an operator of haul machine 110 may "save" a current position or location for reuse later as a destination position or location.

Figure 12:
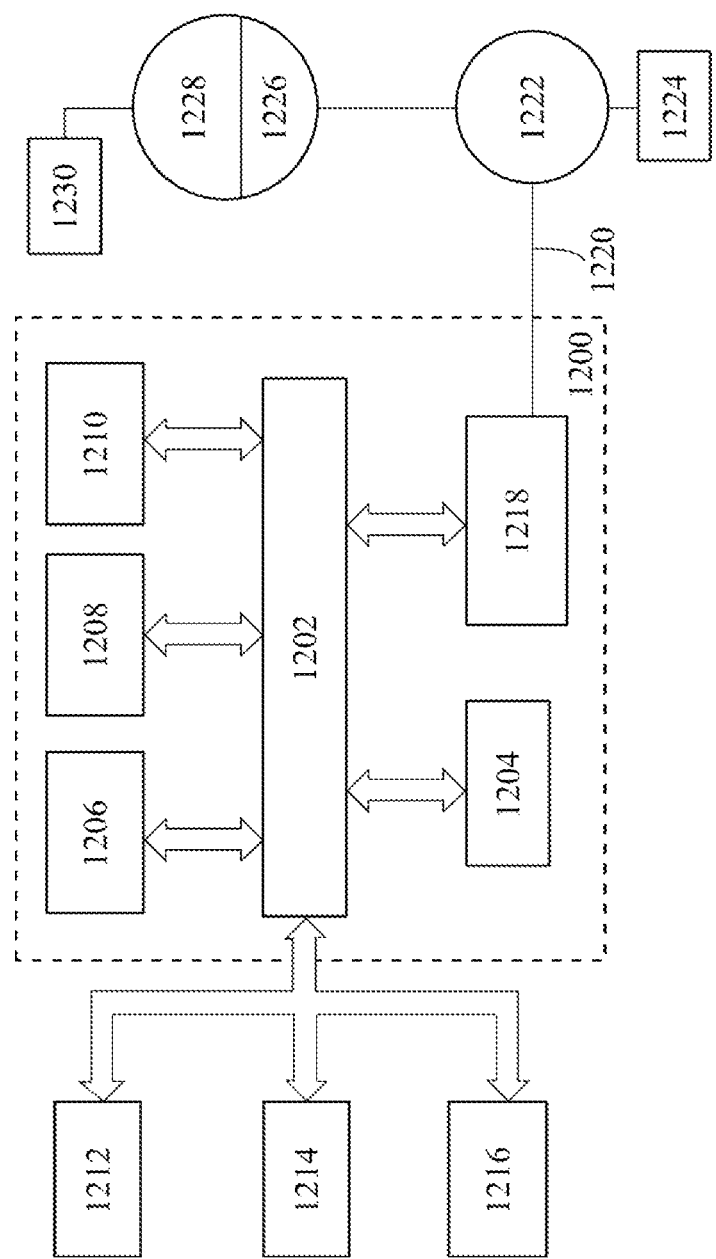
FIG. 12 is a block diagram that illustrates a computer system 1200 upon which aspects of the disclosure may be implemented.

FIG. 12 is a block diagram that illustrates a computer system 1200 upon which aspects of the disclosure may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT) or liquid crystal display (LCD), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Another type of user input device is a touchscreen, which generally combines display 1212 with hardware that registers touches upon display 1212.

The disclosure is related to the use of computer system 1200 for implementing the techniques described herein. According to one embodiment of the disclosure, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

INDUSTRIAL APPLICABILITY

In mining operations, examples systems and methods in accordance with this description may be employed so that mining trucks or other haul machines may quickly and efficiently maneuver into a position suitable to receive excavated materials from mining shovels or other loading machines.

In an example, an operator of a mining truck may seek to position the mining truck at a position for receiving materials from an excavator. Based on locations determined for one or more fiducials, a communication interface may instruct the operator how to operate the mining truck, such as steering and forward or reverse transmission operation, to maneuver the mining truck to a desired position adjacent to the excavator. The fiducials may be mounted on the mining truck, excavator, and/or non-machine mounted locations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for assisted positioning of a haul machine at a destination position for receiving materials from a loading machine, the system comprising:
   at least one perception device included with the haul machine, configured to obtain and provide information reflecting a location or orientation of a first fiducial attached to the loading machine;
   a communication interface located in the haul machine for conveying positioning guidance to a human operator of the haul machine; and
   a processor configured to:
      determine a location or position of the first fiducial based on the information provided by the perception device,
      determine the destination position based on the determined location or position of the first fiducial, and
      issue guidance via the communication interface indicating an adjustment in steering angle based on the determined destination position,
      wherein the determined destination position is located within a particular range of the loading machine.

2. The system of claim 1, wherein the perception device includes a camera and a LIDAR, and the processor is further configured to:

obtain an image of the first fiducial captured by the camera, detect the fiducial and determine an angular position of the first fiducial relative to the haul machine based on the image, obtain distance information for the first fiducial from the LIDAR, and determine a location or position of the first fiducial based on the obtained distance and determined angular position.

3. The system of claim 1, wherein the at least one perception device includes a camera and a LIDAR, and the processor is further configured to:

obtain an image of the first fiducial captured by the camera, detect the first fiducial and determine an angular position of the first fiducial relative to the haul machine based on the image, obtain distance information for the loading machine from the LIDAR, determine a location or position of the loading machine based on the obtained distance and determined angular position, and determine the destination position based on the location or position of the loading machine.

4. The system of claim 1, further comprising:
a second fiducial attached to the haul machine; and
a wireless data communication device, wherein the processor is further configured to:
transmit, via the wireless data communication device, information regarding the location or position of the first fiducial to the loading machine, receive, via the wireless data communication device, information regarding a location or position of the second fiducial determined by the loading machine, and determine the destination position based on the location or position of the first fiducial and the information regarding a location or position of the second fiducial.

5. The system of claim 1, wherein the perception device is further configured to obtain and provide information reflecting a location or orientation of a second fiducial at a fixed reference location, and the processor is further configured to determine a location or position of the haul machine relative to the second fiducial based on the information reflecting a location or orientation of the second fiducial.

6. The system of claim 1, wherein: the perception device is further configured to obtain and provide information reflecting a location or orientation of a second fiducial at a fixed reference location, the information reflecting a location or orientation of a second fiducial is obtained prior to the information reflecting a location or orientation of the first fiducial at time that the first fiducial is not viewable by the at least one perception device, and the processor is further configured to:
determine a location or position of the second fiducial based on the information reflecting a location or orientation of a second fiducial, determine a second destination position based on the determined location or position of the second fiducial, and issue guidance via the communication interface indicating an adjustment in steering angle based on the determined second destination position.

7. A system for assisted positioning of a haul machine at a destination position for receiving materials from a loading machine, the system comprising:
at least one perception device included with the haul machine, configured to obtain and provide information reflecting a location or orientation of a first fiducial attached to the loading machine;
a communication interface located in the haul machine for conveying positioning guidance to a human operator of the haul machine; and
a processor configured to:
determine a location or position of the first fiducial based on the information provided by the perception device, determine the destination position based on the determined location or position of the first fiducial, and issue guidance via the communication interface indicating an adjustment in steering angle based on the determined destination position,
wherein the first fiducial is on or near a bucket used by the loading machine to transfer the materials to the haul machine, and the processor is further configured to determine the location of the first fiducial as a location for the destination position.

8. The system of claim 7, wherein the perception device includes a camera, and the processor is further configured to:
obtain a first image of the first fiducial captured by the camera, decode an identifier for the first fiducial from the obtained image, obtain a second image of a second fiducial captured by the camera, the second fiducial being attached to the loading machine, and distinguish the first fiducial from the second fiducial as being on or near the bucket based on the decoded identifier.

9. A system for assisted positioning of a haul machine at a destination position for receiving materials from a loading machine, the system comprising:
at least one perception device included with the haul machine, configured to obtain and provide information reflecting a location or orientation of a first fiducial attached to the loading machine;
a communication interface located in the haul machine for conveying positioning guidance to a human operator of the haul machine; and
a processor configured to:
determine a location or position of the first fiducial based on the information provided by the perception device, determine the destination position based on the determined location or position of the first fiducial, and issue guidance via the communication interface indicating an adjustment in steering angle based on the determined destination position,
wherein the communication interface includes a graphical display area, and the processor is further configured to:
display and manage a graphical user interface on the graphical display area, display, in the graphical user interface, a top-down view of the haul machine and a graphic element indicating the destination position relative to a current position of the haul machine, display, in the graphical user interface, a left turning navigation indicator if the adjustment requires the operator to rotate a steering wheel counterclockwise, and display, in the graphical user interface, a right turning navigation indicator if the adjustment requires the operator to rotate a steering wheel clockwise.

10. A method for assisted positioning of a haul machine at a destination position for receiving materials from a loading machine, the method comprising:
obtaining from at least one perception device information reflecting a location or orientation of a first fiducial attached to the loading machine;
determining a location or position of the first fiducial based on the information provided by the at least one perception device;
determining the destination position based on the determined location or position of the first fiducial; and
issuing guidance to an operator of the haul machine indicating an adjustment in steering angle based on the determined destination position, wherein the determined destination position is located within a particular range of the loading machine.

11. The method of claim 10, wherein the perception device includes a camera and a LIDAR, and the method further comprises:
obtaining an image of the first fiducial captured by the camera, detecting the fiducial and determining an angular position of the first fiducial relative to the haul machine based on the image, obtaining distance information for the first fiducial from the LIDAR, and determining a location or position of the first fiducial based on the obtained distance and determined angular position.

12. The method of claim 10, wherein the perception device includes a camera and a LIDAR, and the method further comprises:
obtaining an image of the first fiducial captured by the camera, detecting the first fiducial and determine an angular position of the first fiducial relative to the haul machine based on the image, obtaining distance information for the loading machine from the LIDAR, determining a location or position of the loading machine based on the obtained distance and determined angular position, and determining the destination position based on the location or position of the loading machine.

13. The method of claim 10, further comprising:
attaching a fiducial to the haul machine;
transmitting, via a wireless data communication device, information regarding the location or position of the first fiducial to the loading machine;
receiving, via the wireless data communication device, information regarding a location or position of the second fiducial determined by the loading machine; and
determining the destination position based on the location or position of the first fiducial and the information regarding a location or position of the second fiducial.

14. A method for assisted positioning of a haul machine at a destination position for receiving materials from a loading machine, the method comprising:
obtaining from at least one perception device information reflecting a location or orientation of a first fiducial attached to the loading machine;
determining a location or position of the first fiducial based on the information provided by the at least one perception device;
determining the destination position based on the determined location or position of the first fiducial; and
issuing guidance to an operator of the haul machine indicating an adjustment in steering angle based on the determined destination position,
wherein the first fiducial is on or near a bucket used by the loading machine to transfer the materials to the haul machine, and the method further comprises determining the location of the first fiducial as a location for the destination position.

15. The method of claim 14, wherein the perception device includes a camera, and the method further comprises:
obtaining a first image of the first fiducial captured by the camera, decoding an identifier for the first fiducial from the obtained image, obtaining a second image of a second fiducial captured by the camera, the second fiducial being attached to the loading machine, and distinguishing the first fiducial from the second fiducial as being on or near the bucket based on the decoded identifier.

16. A method for assisted positioning of a haul machine at a destination position for receiving materials from a loading machine, the method comprising:
obtaining from at least one perception device information reflecting a location or orientation of a first fiducial attached to the loading machine;
determining a location or position of the first fiducial based on the information provided by the at least one perception device;
determining the destination position based on the determined location or position of the first fiducial;
issuing guidance to an operator of the haul machine indicating an adjustment in steering angle based on the determined destination position;
displaying, in a graphical user interface, a top-down view of the haul machine and a graphic element indicating the destination position relative to a current position of the haul machine;
displaying, in the graphical user interface, a left turning navigation indicator if the adjustment requires the operator to rotate a steering wheel counterclockwise; and
displaying, in the graphical user interface, a right turning navigation indicator if the adjustment requires the operator to rotate a steering wheel clockwise.

17. A system for assisted positioning of a haul machine at a destination position for receiving materials from a loading machine, the system comprising:
perception means for obtaining and providing information reflecting a location or orientation of a first fiducial attached to the loading machine;
a communication interface located in the haul machine for conveying positioning guidance to a human operator of the haul machine;
locating means for determining a location or position of the first fiducial based on the information provided by the at least one perception device;
positioning means for determining the destination position based on the determined location or position of the first fiducial; and
guidance means for issuing guidance via the communication interface indicating an adjustment in steering angle based on the determined destination position,
wherein the determined destination position is located within a particular range of the loading machine.

18. The system of claim 17, wherein the perception means includes a camera and a LIDAR, and the system further comprises:
imaging means for obtaining an image of the first fiducial captured by the camera;
detection means for detecting the fiducial and determining an angular position of the first fiducial relative to the haul machine based on the image; and
ranging means for obtaining distance information for the first fiducial from the LIDAR, wherein the locating means determine the location or position of the first fiducial based on the obtained distance and determined angular position.

19. The system of claim 17, further comprising:
a second fiducial attached to the haul machine;
transmitting means for transmitting information regarding the location or position of the first fiducial to the loading machine; and
receiving means for receiving information regarding a location or position of the second fiducial determined by the loading machine, wherein the positioning means determine the destination position based on the determined location or position of the first fiducial and the information regarding a location or position of the second fiducial.

20. A system for assisted positioning of a haul machine at a destination position for receiving materials from a loading machine, the system comprising:
- perception means for obtaining and providing information reflecting a location or orientation of a first fiducial attached to the loading machine;
- a communication interface located in the haul machine for conveying positioning guidance to a human operator of the haul machine;
- locating means for determining a location or position of the first fiducial based on the information provided by the at least one perception device;
- positioning means for determining the destination position based on the determined location or position of the first fiducial; and
- guidance means for issuing guidance via the communication interface indicating an adjustment in steering angle based on the determined destination position, wherein the communication interface includes a graphical display area, and the system further comprises:

user interface means for displaying and managing a graphical user interface on the graphical display area; and navigation means for:
- displaying, in the graphical user interface, a top-down view of the haul machine and a graphic element indicating the destination position relative to a current position of the haul machine, displaying, in the graphical user interface, a left turning navigation indicator if the adjustment requires the operator to rotate a steering wheel counterclockwise, and displaying, in the graphical user interface, a right turning navigation indicator if the adjustment requires the operator to rotate a steering wheel clockwise.

* * * * *